US011524534B2

(12) United States Patent
Giaier et al.

(10) Patent No.: US 11,524,534 B2
(45) Date of Patent: Dec. 13, 2022

(54) METHODS AND APPARATUS FOR A LOAD-SENSING HITCH UTILIZING A SYSTEM OF STRAIN GAUGES

(71) Applicant: Ford Global Technologies, LLC, Dearborn, MI (US)

(72) Inventors: Kevin Stanton Giaier, Sylvan Lake, MI (US); Bryce Reinert, Frankenmuth, MI (US); Andrew Niedert, New Hudson, MI (US); Joshua Norwood, Detroit, MI (US); Jorge Rivas, Novi, MI (US); Peter Kowalow, Windsor (CA); Rebecca Giaier, Sylvan Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 137 days.

(21) Appl. No.: 16/848,486

(22) Filed: Apr. 14, 2020

(65) Prior Publication Data

US 2021/0318189 A1    Oct. 14, 2021

(51) Int. Cl.
*B60D 1/24* (2006.01)
*G01L 1/22* (2006.01)
*B60D 1/48* (2006.01)

(52) U.S. Cl.
CPC ............ *B60D 1/248* (2013.01); *B60D 1/485* (2013.01); *G01L 1/2206* (2013.01)

(58) Field of Classification Search
CPC .................................................... B60D 1/248
See application file for complete search history.

(56) References Cited

U.S. PATENT DOCUMENTS

| 5,511,812 | A | 4/1996 | Milner |
| 8,103,414 | B2 | 1/2012 | Boss et al. |
| 8,380,390 | B2 | 2/2013 | Sy et al. |
| 9,327,566 | B2 | 5/2016 | McAllister |
| 9,464,953 | B2 * | 10/2016 | Wirthlin ............... G01G 19/08 |
| 9,643,462 | B2 | 5/2017 | McAllister |

(Continued)

FOREIGN PATENT DOCUMENTS

| DE | 102014217801 | 3/2016 |
| EP | 2363307 | 9/2011 |

(Continued)

OTHER PUBLICATIONS

Wirthlin, "Intelligent Hitch for Measuring Both Trailer Weight and Tongue Weight," Jun. 26, 2015, 5 pages.

*Primary Examiner* — Kevin Hurley
(74) *Attorney, Agent, or Firm* — Gregory Brown; Hanley, Flight & Zimmerman LLC

(57) ABSTRACT

Methods and apparatus are disclosed for a load-sensing hitch utilizing a system of strain gauges. An example apparatus includes a hitch including a first support including a first end, a second end, and a mid-portion located between the first end and the second end, the mid-portion having a cross-sectional area smaller than the cross-sectional area of the first end or the cross-sectional area of the second end, a strain gauge located at the mid-portion of the first support, a frame attachment to couple the hitch to a frame of a vehicle, the support coupled to the frame attachment, and a load manager to determine a load condition based on sensor data from the strain gauge.

17 Claims, 8 Drawing Sheets

(56) References Cited

U.S. PATENT DOCUMENTS

| | | | |
|---|---|---|---|
| 9,870,653 B1 | 1/2018 | Fritz et al. | |
| 9,981,512 B2* | 5/2018 | Gentner | |
| 10,696,109 B2* | 6/2020 | Gie ibl | G01L 5/169 |
| 10,899,183 B2 | 1/2021 | Niedert et al. | |
| 11,097,580 B2* | 8/2021 | Niedert | B60D 1/248 |
| 2013/0038436 A1 | 2/2013 | Brey et al. | |
| 2013/0080078 A1* | 3/2013 | Wirthlin | G01L 5/136 |
| | | | 702/42 |
| 2013/0253814 A1 | 9/2013 | Wirthlin | |
| 2014/0360282 A1 | 12/2014 | Gießibl | |
| 2015/0137482 A1 | 5/2015 | Woolf et al. | |
| 2019/0033150 A1 | 1/2019 | Lassche | |
| 2019/0070915 A1 | 3/2019 | Gentner et al. | |
| 2019/0084362 A1 | 3/2019 | Sielhorst et al. | |
| 2019/0143769 A1 | 5/2019 | Niedert et al. | |
| 2019/0263204 A1 | 8/2019 | Reed et al. | |
| 2019/0265112 A1 | 8/2019 | Reed et al. | |
| 2019/0315169 A1 | 10/2019 | Rogness et al. | |
| 2019/0344631 A1 | 11/2019 | Gießibl | |
| 2020/0180371 A1 | 6/2020 | Niedert et al. | |
| 2020/0198422 A1 | 6/2020 | Niedert et al. | |
| 2020/0355563 A1* | 11/2020 | Schamer | G01L 5/0033 |
| 2020/0384818 A1 | 12/2020 | Giaier et al. | |
| 2021/0039457 A1* | 2/2021 | Niedert | B60D 1/065 |
| 2021/0170818 A1* | 6/2021 | Doman | G01G 19/10 |

FOREIGN PATENT DOCUMENTS

| | | | | |
|---|---|---|---|---|
| EP | 3698994 A1 * | 8/2020 | | B60D 1/248 |
| WO | 2018171937 | 9/2018 | | |
| WO | 2020243703 | 12/2020 | | |

\* cited by examiner

METHODS AND APPARATUS FOR A LOAD-SENSING HITCH UTILIZING A SYSTEM OF STRAIN GAUGES

FIELD OF THE DISCLOSURE

This disclosure relates generally to vehicle hitches and, more particularly, to methods and apparatus for a load-sensing hitch utilizing a system of strain gauges.

BACKGROUND

In recent years, consumer vehicles capable of pulling trailers have implemented additional data processing capabilities. With these capabilities, vehicles can process parameters of a vehicle and/or trailer not previously processed to provide additional insights to a user of the vehicle. For example, an additional parameter of the vehicle that can be processed is the load condition experienced at a hitch. The load condition includes various characteristics (e.g., tongue load, sway force, acceleration force, braking force, etc.) experienced by the hitch.

Different vehicle models often have different configurations, including spare tire placement, fuel tank placement, floorboard height, frame rail spacing, etc. As a result, the hitch design may vary significantly between model types. Regardless of the specific model of a vehicle, vehicle hitches generally include a receiver tube and a crossbar. The receiver tube of a hitch is used to couple a towing element (e.g., a hitch ball, a drawbar, etc.) to the vehicle and often has a square cross-section. A crossbar is a tube connecting the driver and passenger sides of a vehicle frame or a vehicle body structure to the receiver tube.

SUMMARY

Methods and apparatus for a load-sensing hitch utilizing a system of strain gauges are disclosed. An example apparatus includes a hitch, the hitch including a first support including a first end, a second end, and a mid-portion located between the first end and the second end, the mid-portion having a cross-sectional area smaller than the cross-sectional area of the first end or the cross-sectional area of the second end. The example apparatus also includes a strain gauge located at the mid-portion of the first support, a frame attachment to couple the hitch to a frame of a vehicle, the support coupled to the frame attachment, and a load manager to determine a load condition based on sensor data from the strain gauge.

An example method includes receiving load data associated with a hitch from a strain gauge, the strain gauge positioned at a mid-portion of a first support, the first support coupled to a frame attachment connected to a frame of a vehicle. The example method also includes determining a load condition of the hitch, the load condition determined using the load data. The example method further includes generating an alert for display via a user interface when a load on the hitch exceeds a tow rating of the vehicle.

An example non-transitory computer readable storage medium includes instructions that, when executed, cause a processor to at least receive load data associated with a hitch from a strain gauge, the strain gauge positioned at a mid-portion of a first support, the first support coupled to a frame attachment connected to a frame of a vehicle. The example instructions further cause the processor to determine a load condition of the hitch, the load condition determined using the load data. The example instructions also cause the processor to generate an alert for display via a user interface when a load on the hitch exceeds a tow rating of the vehicle.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
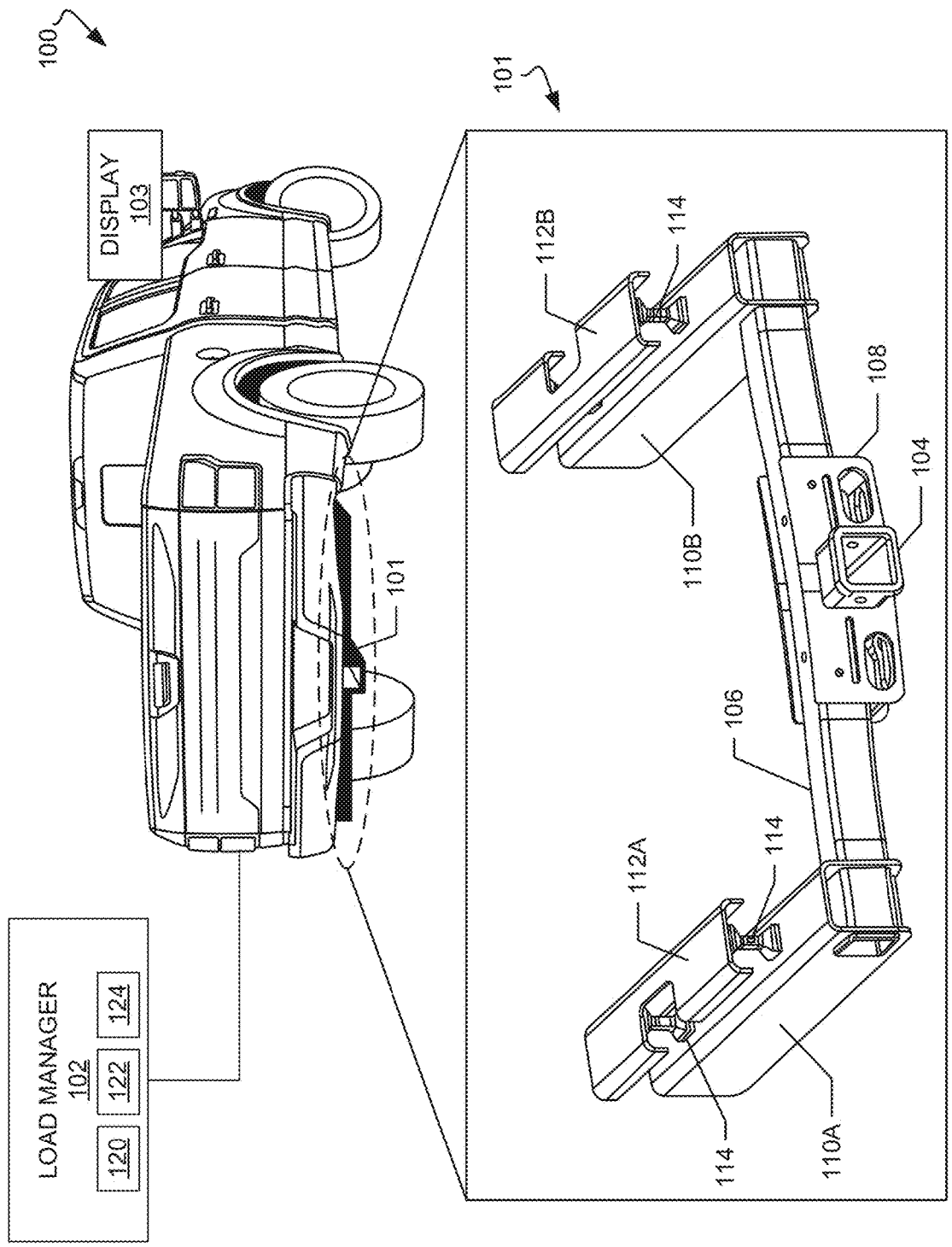
FIG. 1 illustrates an example vehicle including a hitch system load manager and a hitch including strain gauges in accordance with the examples disclosed herein.

The maximum weight a given vehicle can tow (e.g., towing capacity) is determined by the vehicle manufacturer and takes into consideration several ratings, including a vehicle weight rating (e.g., maximum loaded weight of a vehicle and/or a trailer), a combined vehicle rating (e.g., maximum weight of vehicle with a fully loaded trailer attachment), and an axle weight rating (e.g., maximum weight that can be placed on front/rear axles), as well as a tongue weight (e.g., downward force exerted on the back of the tow vehicle). In addition to structural capacity, the vehicle tow rating can also be determined by powertrain capacity and brake sizing. A vehicle hitch can be attached to a vehicle chassis (e.g., load-bearing framework) for purposes of towing. However, many vehicle hitch designs are specific to individual vehicle models and, thus, can require the hitch to have unique shapes and parts specific to each vehicle model. Variations in hitch design between vehicle models can be attributed to the shape of the rear bumper housing, packaging requirements for the spare tire, floorboard height, frame rail spacing, etc. These variations in hitch design can make it difficult to package force-sensing elements (e.g., pins, strain gauges, etc.) into a hitch. For example, each hitch design can require specifically designed force-sensing elements, which can increase manufacturing cost and reduce availability of replacement parts. Additionally, in some known examples, hitches including force sensing elements require significant packaging area that can negatively affect vehicle length, vehicle departure angle and spare tire placement. Accordingly, packaging force sensing elements about the receiver tube of a hitch may not be possible for some vehicle configurations.

Examples disclosed herein describe methods and apparatus for a load-sensing hitch utilizing a system of strain gauges that can be implemented on a variety of vehicles due to the system of strain gauges allowing easier coupling to the vehicle compared to other technologies. In the examples disclosed herein, the system of strain gauges refers to a number of strain gauges that cooperate operatively to determine one or more force(s) on the hitch. More specifically, in the examples disclosed herein, the load sensing trailer hitch utilizes a system of strain gauges located on four load path attachment members. The trailer hitch requires no moving or sliding interfaces and can be modified to accommodate a variety of different structures. For example, the trailer hitch can be used to sense the force being applied through a receiver tube of a trailer hitch system and/or estimate tongue weight of a trailer in addition to lateral and brake/acceleration loads to promote proper utilization of trailer hitch systems. In the examples disclosed herein, at least two structural attachment points can constrain the receiver tube to properly mitigate differing moment arms caused by the geometric differences between custom drawbars. In the examples disclosed herein, forces (e.g., forces applied on a hitch ball) can be calculated using a minimum number of strain gauge readings to interpret the load fully (e.g., using response surface modeling), without the need for free body diagram-based solutions or mitigation of geometric differences in the hitch.

In the examples disclosed herein, the hitch system components can have a symmetric structural design that houses sensors (e.g., strain gauges) outboard in a main frame rail of the vehicle, such that a method disclosed herein can be used to determine a unique load case that causes both constructive and destructive strain gain at each sensor. For example, strain gauges are attached to the hitch system structural members to allow for a linear deformation within the expected loading range of the vehicle. In some examples, hitch system structural members can be aligned with each other parallel to the center line of the vehicle, with some member(s) disposed towards the rear of the vehicle and other member(s) disposed towards the front of the vehicle. In some examples, a total of 16 locations are available for strain gauge attachments, and optimization algorithms may be used to determine the number and position of strain gauges required to estimate force components and position coordinates of a specific type of load or loading condition. To differentiate the portion of strain gauge signal that can be attributed to the number of sensors used, a system of strain gauges is used to build a response surface and solve for the unique load case that creates strain in the sensors. For example, output of data using a system of strain gauges can be used to calculate force components, force locations, system error over a range of force magnitude and locations, as well as optimal number and location of strain gauges to include in the system. Furthermore, in the examples disclosed herein, the hitch can include a set of strain gauges that creates a system that is statically indeterminate. The methods and apparatus disclosed herein permit assessment of the statically indeterminate system such that measurement of vertical, horizontal, and lateral force loads imparted on a towing vehicle can be performed (e.g., to determine too much or too little tongue weight, ensure proper operation of the towing vehicle, etc.) while also minimizing the total number of sensors (e.g., strain gauge(s)) to be used in order to reduce the hitch system cost and complexity.

FIG. 1 illustrates an example vehicle 100 including an example hitch 101 and an example load manager 102 by which the examples disclosed herein may be implemented. The load manager 102 is communicatively coupled to at least one example display 103. In the illustrated example of FIG. 1, the hitch 101 includes an example receiver tube 104, an example crossbar 106, an example chain bracket 108, an example first side member 110A, an example second side member 110B, an example first frame attachment member 112A, an example second frame attachment member 112B, and example support structure(s) 114.

In the illustrated example of FIG. 1, the vehicle 100 can tow a trailer coupled to the vehicle 100 via the example hitch 101. For example, a tow ball can be coupled to the hitch 101 via the receiver tube 104. The coupled tow ball enables a trailer to be pivotally coupled to the hitch 101. In the illustrated example, the vehicle 100 is a consumer automobile. In other examples, the vehicle 100 can be a commercial truck, a motorcycle, a motorized cart, an all-terrain vehicle, a motorized scooter, a locomotive, or any other vehicle.

The load manager 102 receives load information (e.g., forces, torques, etc.) from hitch sensors (e.g., strain gauges 204). In some examples, the load manager 102 can analyze the received load information to determine a load condition of the vehicle 100 and/or the hitch 101. For example, the load manager 102 can determine a vertical load condition (e.g., a load condition in a direction orthogonal to the ground), a horizontal load condition (e.g., a load condition in a direction parallel to the receiver tube 104, etc.) and/or a lateral load condition (e.g., a load condition in a direction parallel to the crossbar 106, etc.). In some examples, if the load condition satisfies an alert threshold, the load manager 102 can generate an alert to indicate to a user of the vehicle 100 that the vehicle 100 is improperly loaded. The load manager 102 can be communicatively coupled to the example display 103.

The display 103 can be, in some examples, within an interior of the vehicle 100 (e.g., a dashboard display, an overhead display, etc.). Additionally or alternatively, the display 103 can be included in a mobile device (e.g., a smartphone, a tablet, a smartwatch, etc.) of an operator or a passenger of the vehicle 100. In some examples, the display 103 can display the load condition determined by the load manager 102. In some examples, the display 103 can present an alert to a user of the vehicle 100 when a load condition satisfies an alert threshold.

The receiver tube 104 can be used to couple a towing element (e.g., a hitch ball, a drawbar, etc.) to the vehicle 100 and can have a square cross-section. Load applied at the receiver tube 104 to the vehicle 100 can be transferred by a crossbar (e.g., the crossbar 106). The crossbar 106 can, in some examples, include a quadrilateral cross-section. In other examples, the crossbar 106 can have any other suitable cross-section (e.g., polygonal, circular, ovoid, etc.). In the illustrated example, the example crossbar 106 is a single continuous tube. In other examples, the crossbar 106 can be two tubes bisected by the receiver tube 104.

The chain bracket 108 acts as redundant attachment point between the hitch 101 and a coupled trailer. For example, one or more chains or similar mechanical elements can be coupled to the hitch 101 and the chain bracket 108. In operation, if the primary coupling between the trailer and the hitch 101 decouples (e.g., the coupling via the receiver tube 104, etc.), the chain(s) prevent the trailer from becoming detached from the hitch 101.

The first side member 110A and the second side member 110B are attached to either side of the crossbar 106 and can be used to couple the support structure(s) 114 to the first frame attachment member 112A and/or the second frame attachment member 112B, respectively, as part of an overall coupling of the hitch 101 to the vehicle 100. In some examples, the side member(s) 110A, 110B are coupled to the crossbar 106 via welds. However, the side member(s) 110A, 110B can be coupled to the crossbar 106 via any other suitable means (e.g., welded, riveted, press-fit, etc.). While one example implementation of the side member(s) 110A, 110B is illustrated in FIG. 1, the side member(s) 110A, 110B can have any other suitable shape, etc.

The first frame attachment member 112A and/or the second frame attachment member 112B can be used to couple the hitch 101 to the vehicle 100 to allow for load sensing when load from the crossbar 106 (e.g., from a coupled trailer, from any other load on the towing attachment area, etc.) is transferred to the vehicle frame. In the example of FIG. 1, the frame attachment member(s) 112A, 112B are oriented parallel to the side members 110A, 110B. In some examples, the first frame attachment member 112A and/or the second frame attachment member 112B are rigidly bolted to the vehicle 100 frame. For example, the frame attachment member(s) 112A, 112B can be coupled to the frame of the vehicle 100 via one or more fasteners. In other examples, the frame attachment member(s) 112A, 112B can be coupled to the vehicle 100 via any other suitable means (e.g., welds, etc.).

The support structure(s) 114 can be positioned between the side member(s) 110A, 110B and the frame attachment member(s) 112A, 112B. In the example of FIG. 1, the support structure(s) 114 are oriented perpendicular to the crossbar 106. The support structure(s) 114 can include strain gauges, described in more detail in connection with FIG. 2. More specifically, in some examples, strain gauges are positioned at the support structure(s) 114 to sense the force applied through the receiver tube 104 of a trailer hitch system to estimate the tongue weight of a trailer. As described in more detail in connection with FIG. 2, the support structure(s) 114 can include one or more strain gauges. In some examples, the strain gauges can be located on portions of the support structure(s) 114 having a reduced cross-sectional area. In some examples, a total of four support structure(s) 114 are positioned symmetrically about a center line of the vehicle 100, with two support structure(s) 114 on each side. For example, the support structure(s) 114 may be in line with each other parallel to the center line of the vehicle 100, with one support structure 114 located towards the forward edge of the vehicle 100 and the other located further aft. In some examples, the support structure(s) 114 can be positioned in any other arrangement and is not limited to the positioning/arrangement illustrated in FIGS. 1-5.

The side member(s) 110A, 110B, the frame attachment member(s) 112A, 112B, and/or the support structure(s) 114 can be composed of any suitable material or combination thereof (e.g., aluminum, cast iron, steel, plastic, etc.). In some examples, the side member(s) 110A, 110B, the frame attachment member(s) 112A, 112B, and/or the support structure(s) 114 are manufactured via stamping. In other examples, the side member(s) 110A, 110B, the frame attachment member(s) 112A, 112B, and/or the support structure(s) 114 can be manufactured via any suitable manufacture or combination thereof (e.g., weldment casting, extrusion, etc.).

In the illustrated example of FIG. 1, the load manager 102 includes an example sensor interface 120, an example load determiner 122, and an example vehicle interface 124.

The example sensor interface 120 receives data from the support structure-based strain gauge(s) and/or any other components of the vehicle 100 and/or hitch 101. In some examples, the sensor interface 120 can convert the data received from the components into a numerical form (e.g., human readable, etc.). For example, if a load-sensing sensor outputs an analog signal (e.g., an analog voltage, an analog current, etc.) the sensor interface 120 can convert the received data into values corresponding to the loads detected by the hitch 101.

The example load determiner 122 analyzes the received load signal(s) from the sensor interface 120 to determine the vertical load condition of the vehicle 100, the horizontal load condition of the vehicle 100 and/or the lateral load condition of the vehicle 100. For example, the load determiner 122 can use static equilibrium analysis (e.g., force balancing, moment balancing, etc.) and/or an algorithm to solve for a statically indeterminate system (e.g., a system for which static equilibrium equations, including force and moment equilibrium conditions, are insufficient to determine the internal forces and reactions on the given structure), as described in connection with FIG. 5B. In some examples, the load determiner 122 can determine if at least one of the load conditions satisfies an alert threshold. In some examples, the alert threshold corresponds to an improper (e.g., misload, unbalanced, etc.) load condition.

The example vehicle interface 124 generates a notification to be presented to a user of the vehicle 100. For example, the vehicle interface 124 can generate an alert if the load determiner 122 determines that an alert threshold is satisfied. In some examples, the vehicle interface 124 can generate a visual alert to be presented to the user via the display 103. Additionally or alternatively, the vehicle interface 124 can generate an auditory alert to be presented to the user (e.g., the alert may be presented over speakers of the vehicle 100, a mobile device of the user, etc.). In some examples, the vehicle interface 124 can generate instructions indicating to the user how to correct the load condition. In some examples, the vehicle interface 124 can enable the load manager 102 to receive data from the vehicle 100. For example, the vehicle interface 124 can receive the drawbar dimensions from the vehicle 100 (e.g., input by a user into the interface of the vehicle 100, etc.). In some examples, the vehicle interface 124 can receive data from additional sensors associated with the vehicle 100 (e.g., accelerometers, ride height sensors, etc.). In such examples, the load determiner 122 can further base the load condition on data from any other sensors of the vehicle 100. For example, powertrain torque sensors can be used to estimate an overall trailer mass when coupled with an acceleration load at the hitch 101 of FIG. 1. Additionally, backup camera algorithms can be used to estimate drawbar lengths.

While an example manner of implementing the load manager 102 of FIG. 1 is illustrated in FIG. 1, one or more of the elements, processes and/or devices illustrated in FIG. 1 may be combined, divided, re-arranged, omitted, eliminated and/or implemented in any other way. Further, the example sensor interface 120, the example load determiner 122, and the example vehicle interface 124 and/or, more generally, the example load manager 102 of FIG. 1 may be implemented by hardware, software, firmware and/or any combination of hardware, software and/or firmware. Thus, for example, any of the example sensor interface 120, the example load determiner 122, and the example vehicle interface 124 and/or, more generally, the example load manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 120, the example load determiner 122, and the example vehicle interface 124 is/are hereby expressly defined to include a non-transitory computer readable storage device or storage disk such as a memory, a digital versatile disk (DVD), a compact disk (CD), a Blu-ray disk, etc. including the software and/or firmware. Further still, the example load manager 102 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
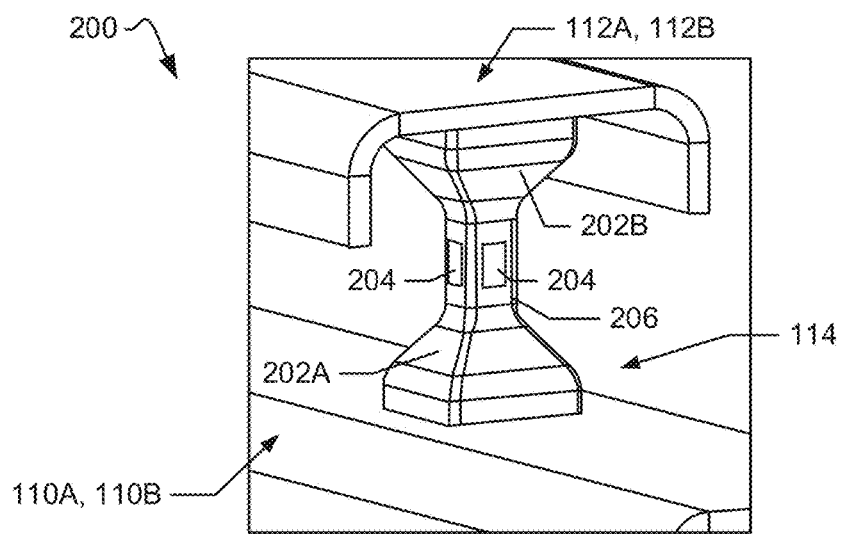
FIG. 2 illustrates a perspective view of an example support structure including strain gauges as part of the hitch of FIG. 1.

FIG. 2 illustrates a perspective view 200 of the example support structure 114 including example strain gauge(s) 204 as part of the hitch 101 of FIG. 1. The support structure 114 is positioned between the side member(s) 110A, 110B and the frame attachment member(s) 112A, 112B. The support structure 114 can include example structure base(s) 202A, 202B having greater cross-sectional area than an example mid-portion structure 206. While in the example of FIG. 2 the support structure 114 has an hourglass-like shape, the support structure 114 can have any other suitable shape that is conducive to load sensing. The example geometry of the support structure 114 can be determined based on which geometry permits increased sensitivity to lateral loads, such that the strain gauge(s) 204 can capture the highest stress resulting from the applied load(s). In the example of FIG. 2, the strain gauge(s) 204 (e.g., time and temperature stable strain gauges, etc.) are positioned on the support structure 114 at a contact point having the smallest cross-sectional area (e.g., the mid-portion structure 206 of the support structure 114). The strain gauge(s) 204 are used to calculate a load at a hitch ball, as described in more detail in connection with FIG. 3. As shown in FIG. 1, the hitch 101 can include four points of contact (e.g., four support structure(s) 114) to support the load of the hitch 101, as well as to sense the strain within the four points of contact using the strain gauge(s) 204. For example, using four points of contact (e.g., four support structure(s) 114) allows for the load manager 102 to mitigate geometry changes in the X-direction, as further described in connection with FIG. 3. In the example of FIG. 2, each of the four sides of the mid-portion structure 206 of the support structure 114 includes a strain gauge 204. In some examples, the total number and location of sensors (e.g., strain gauge(s) 204) on the support structure 114 can be minimized based on the ability of the load manager 102 to accurately calculate the magnitude, direction, and/or location of the force (e.g., using a sensitivity analysis to determine which sensors have the largest impact on force calculation, as described in more detail in association with FIGS. 4-5). The strain gauge(s) 204 convert applied force (e.g., from a load applied to a hitch ball) into a change in electrical resistance that can be measured using the load manager 102 (e.g., using sensor interface 120 and/or the load determiner 122), allowing the determination of strain (e.g., displacement and deformation of hitch 101, expansion and/or contraction of hitch 101, etc.).

Figure 3:
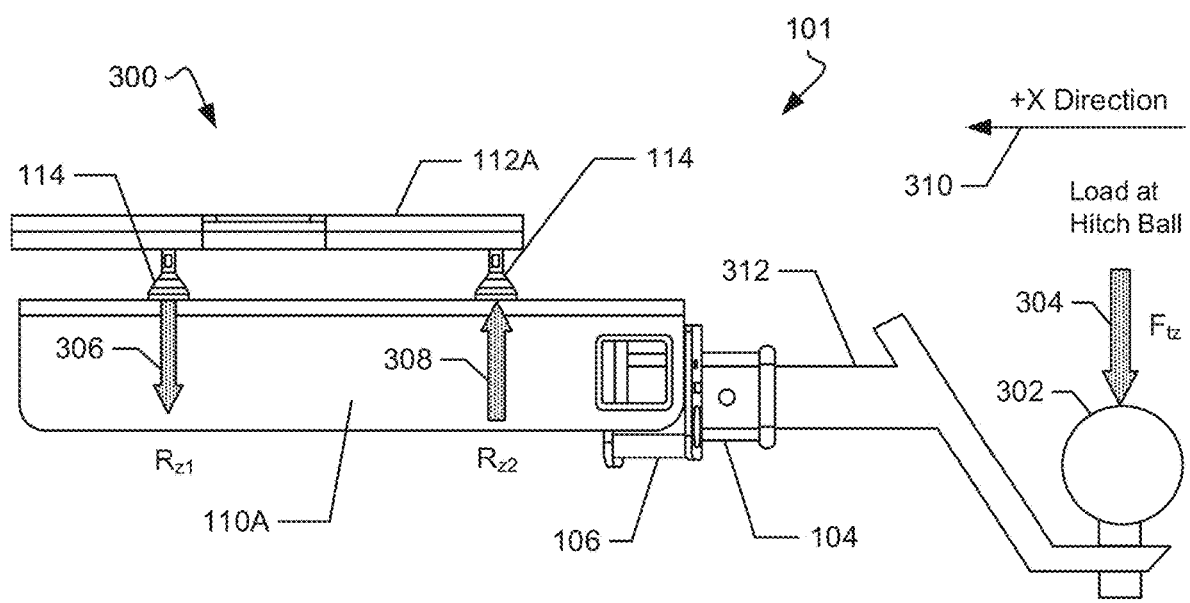
FIG. 3 illustrates a side view of the hitch of FIG. 1, including an example loading condition on a hitch ball associated with a trailer.

FIG. 3 illustrates a side view of the hitch 101 of FIG. 1, including an example loading condition 300 on an example hitch ball 302. FIG. 3 shows the support structure(s) 114 positioned between the side member 110A and the frame attachment member 112A, with the side member 110A connected to the crossbar 106, and the crossbar 106 coupled to the receiver tube 104. In the illustrated example of FIG. 3, the load condition 300 is based on a load applied to the hitch ball 302, where the load is transmitted to the vehicle frame via the support structure(s) 114. In the illustrated example, the load condition 300 is based on an example vertical load 304 applied at the hitch ball 302, an example first vertical reaction load 306 (e.g., $R_{z1}$) applied at support structure 114, and an example second vertical reaction load 308 (e.g., $R_{z2}$) at the support structure 114 located forward of the receiver tube 104. In the illustrated example of FIG. 3, the support structure(s) 114 positioned between the side member 110B and the frame attachment member 112B are not illustrated but carry a portion (e.g., an equal portion, etc.) of the vertical load 304. When the vertical load 304 is applied to the hitch ball 302, the load manager 102 determines the applied load using the four points of contact (e.g., four support structures 114). For example, the support structure 114 can be used to support the applied load and sense the strain using the strain gauge(s) 204. In some examples, as shown in FIG. 3, the use of four points of contact (e.g., four support structures 114) allows for the system to mitigate geometry changes in an X direction 310 (e.g., drawbar 312 geometry changes). The X direction 310 in this example is parallel to a center line of the vehicle 100. In some examples, the load manager 102 can use static equilibrium analysis (e.g., torque balancing, force balancing, etc.) to determine a magnitude of the applied vertical load 304. In some examples, using a system of strain gauges described herein, the load manager 102 uses an algorithm to solve for a statically indeterminate system, as described in connection with FIG. 5B. For example, using a static equilibrium analysis, the presence of two support structures 114 along the X direction 310 allows for geometry mitigation by solving a sum of forces for a Z-component load ($\Sigma F_z$) of the applied vertical load 304 ($F_{tz}$), using the first vertical reaction load 306 (e.g., $R_{z1}$), and the second vertical reaction load 308 (e.g., $R_{z2}$), as shown below in Equation (1):

$$\Sigma F_z = 0 = -R_{z1} + R_{z2} - F_{tz} \quad (1)$$

In the example of FIG. 3, the applied vertical load 304 is equal and opposite to the sum of the vertical reaction loads 306, 308. Similarly, an applied lateral load can be calculated using the same method, where the applied lateral load (not shown) is equal and opposite to the sum of a first lateral reaction load ($R_{y1}$) and a second lateral reaction load ($R_{y2}$). However, in the presence of deformations that cause statically indeterminate conditions, the load manager 102 can perform calculations that are specific to the loading on the hitch ball 302 (e.g., generate a response surface model specific to a given load and the structure onto which the load is applied), as described in connection with FIG. 5B. As such, forces are calculated based directly on the strain gauge 204 readings, with effective use of strain gauges 204 to sense the force being applied through the receiver tube 104 of a trailer hitch system. The four contact points (e.g., the support structure(s) 114 positioned between the side member(s) 110A, 110B and frame attachment member(s) 112A, 112B) permit transmission of force such that strain can be maintained as linearly related to the force as possible, creating the highest delta of strain values while maintaining the necessary strength to achieve a desired tow rating. Strain in the four contact points (e.g., support structure(s) 114) is measured by the strain gauge(s) 204 located at the smallest cross-section of the four contact points. In some examples, such measurements can be performed using six strain gauges 204, as described in connection with FIGS. 4-5. When loads are applied at the hitch ball 302 (e.g., vertical load 304 of FIG. 3), the hitch 101 geometry supports the weight and bends slightly (e.g., as illustrated in the example of FIG. 5B). The amount of bending is sensed or measured by the strain gauges 204. In some examples, readings from the strain gauges 204 (e.g., obtained using the sensor interface 120) are used to calculate the force (e.g., using the load determiner 122) in an onboard processor (e.g., using load manager 102), with the calculated force value updated in real time and displayed to the user (e.g., using vehicle interface 124 and/or display 103).

Figure 4:
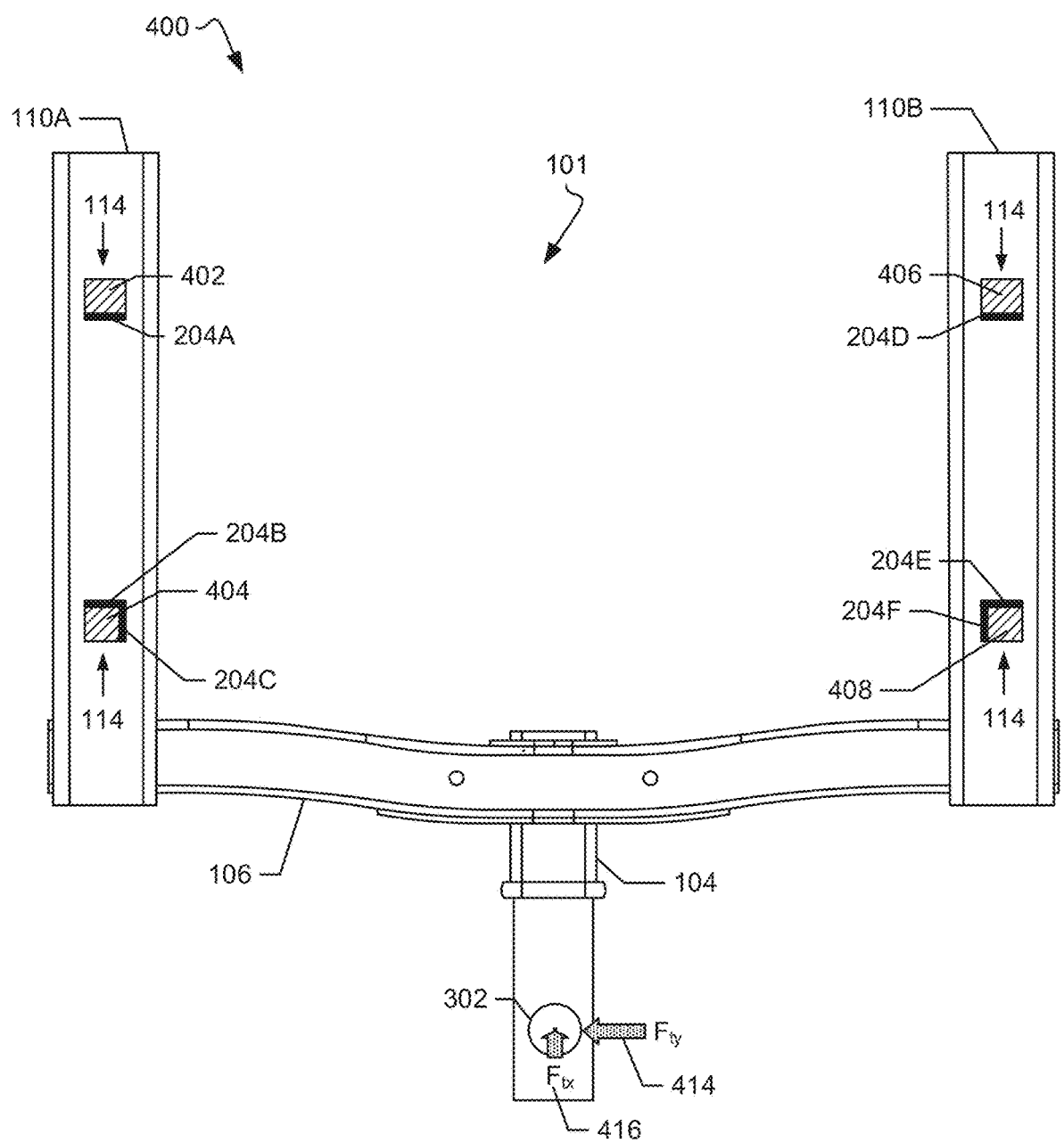
FIG. 4 illustrates a cross-sectional view of support structures of the hitch of FIG. 1, including strain gauge positioning to optimize the total number of strain gauges used for load sensing.

FIG. 4 is a cross-sectional view 400 of support structures of the hitch of FIG. 1, illustrating strain gauge positioning to optimize the total number of strain gauge(s) 204 used for load sensing. The example of FIG. 4 indicates the positioning of strain gauge(s) 204 on the support structure(s) 114 (e.g., located between the side member(s) 110A, 110B and the frame attachment member(s) 112A, 112B), thereby resulting in the fewest number of strain gauge(s) 204. In the example of FIG. 4, the cross-sections of the support structure(s) 114 (e.g., a first cross-section 402, a second cross-section 404, a third cross-section 406, and a fourth cross-section 408) are shown at the mid-portion structure 206 of FIG. 2 to illustrate strain gauge positioning on the side(s) and/or flat surface(s) of the mid-portion structure(s) 206. The strain gauge(s) 204 can be positioned on any one or more sides of the mid-portion structure 206, as described in connection with FIG. 2, to sense the force components of the load applied on the hitch ball 302 (e.g., a lateral force component 414, vertical force components 416, etc.). In the example of FIG. 4, the strain gauge(s) 204 are positioned such that the first cross-section 402 shows a first strain gauge 204A positioned on a rear side of the mid-portion structure 206, the second cross-section 404 shows a second strain gauge 204B on a forward side and a third strain gauge 204C on an inboard side, the third cross-section 406 shows a fourth strain gauge 204D on a rear side, and the fourth cross-section 408 shows a fifth strain gauge 204E on a forward side and a sixth strain gauge 204F on an inboard side, such that all strain gauge(s) 204 are positioned on the side and/or flat surface of the mid-portion structure 206 of the support structure(s) 114. However, any strain gauge(s) 204 and/or the strain gauge 204A, 204B, 204C, and/or 204D of FIG. 4 can be oriented and/or positioned in any manner as part of the support structure(s) 114. In some examples, the cross-section(s) 402, 404, 406, and/or 408 can form any cross-sectional geometry (e.g., circular, triangular, polygonal, etc.). In some examples, statistical sensitivity data can be used to determine the number of strain gauge(s) 204 that can be used to repeatedly calculate the force and location of a load applied at the hitch (e.g., load applied at hitch ball 302 of FIG. 3) while maintaining an accuracy of <1% error. For example, a total of six strain gauges (204A, 204B, 204C, and 204D) may be used to maintain an accuracy of <1% error, based on statistical sensitivity data (e.g., examination of the impact of variations in model inputs, such as input force component(s) and input force position(s), on the variations in model outputs) and additional testing, as described in connection with FIG. 5B. The locations of the strain gauges 204A, 204B, 204C, and/or 204D is important to the accuracy of the system, such that the layout of active strain gauges is an optimized layout using statistical analysis of the strain responses of the system, as described in connection with FIG. 5B.

Figure 5A:
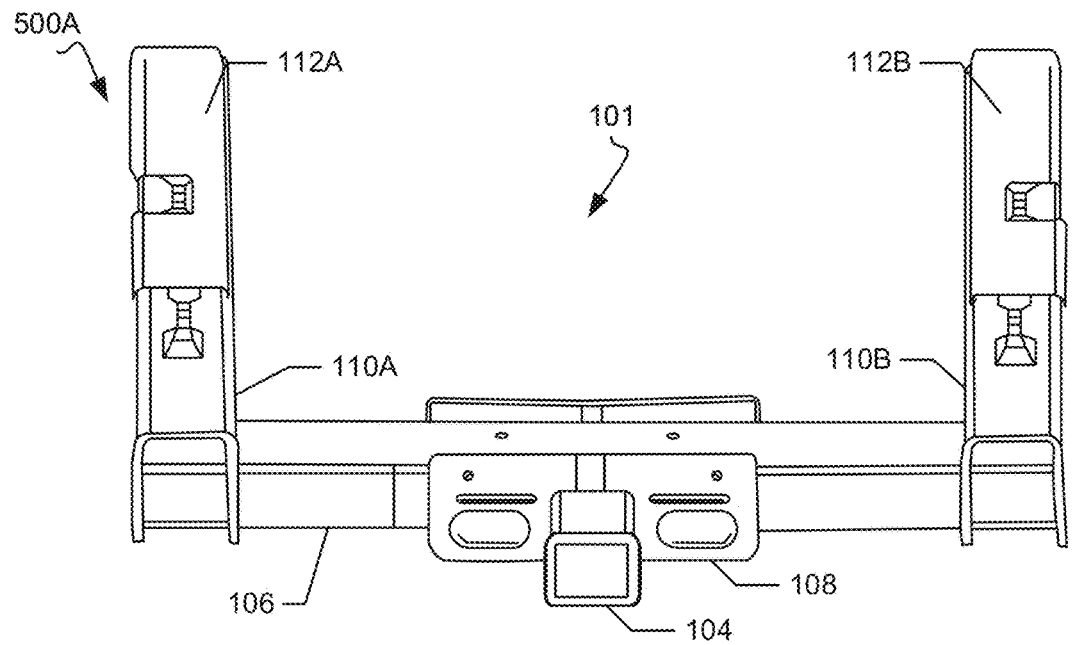
FIG. 5A illustrates an example perspective view of an unloaded hitch.
Figure 5B:
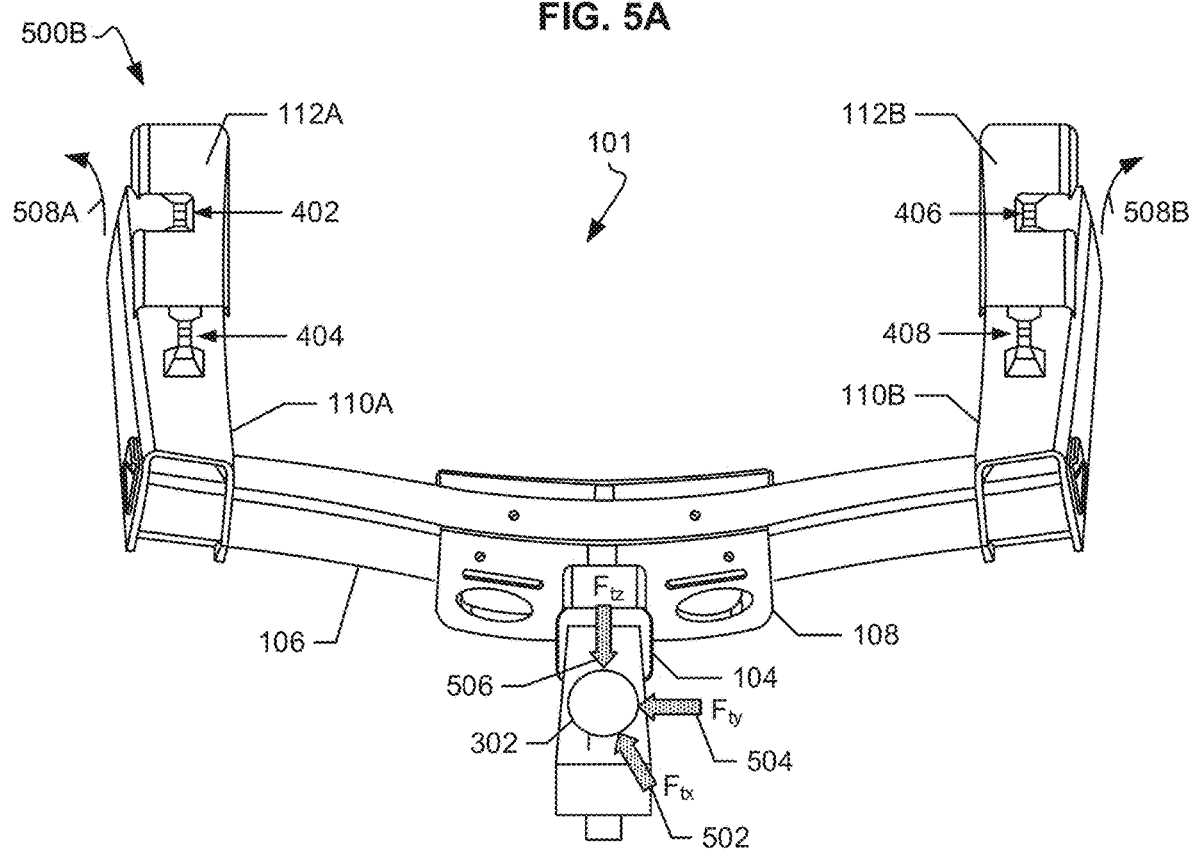
FIG. 5B illustrates an example loading condition on a hitch ball associated with a trailer that results in deflection of hitch components while allowing use of strain gauges to determine force components.

FIG. 5A illustrates an example perspective view 500A of an unloaded hitch 101. In the example of FIG. 5A, the hitch 101 components (e.g., the receiver tube 104, the crossbar 106, the chain bracket 108, the side member(s) 110A, 110B, and the frame attachment member(s) 112A, 112B) are unloaded (e.g., no deflection of hitch 101 components). FIG. 5B illustrates an example loading condition 500B of the hitch ball 302 that results in deflection of components of the hitch 101 while allowing use of the strain gauge(s) 204 (e.g., 204A, 204B, 204C, and/or 204D) to determine the force components. When an example load 506 ($F_{tz}$) is present on the hitch ball 302, deflection in the crossbar 106 can cause the side member(s) 110A, 110B to deflect outward (e.g., away from the vehicle 100). In some examples, the outward deflection of the side member(s) 110A, 110B exceeds the downward deflection of the side member(s) 110A, 110B. For example, as the crossbar 106 pulls in the rearmost ends of the side member(s) 110A and/or 110B, forward portions of the side member(s) 110A and/or 110B are deflected outward (as shown using arrows 508A and 508B). In some examples, a lateral deflection of the side member(s) 110A, 110B exceeds a vertical deflection and/or a horizontal deflection of the side member(s) 110A, 110B. The presence of this non-intuitive deformation makes it difficult to create a simple system to calculate forces, such as using a static equilibrium analysis. However, the system of strain gauge(s) described herein (e.g., the strain gauge(s) 204A, 204B, 204C, 204D, 204E, and/or 204F) permits the force at the hitch 101 to be calculated using analysis for a statically indeterminate system. For example, while the strain gauge(s) 204 can be calibrated to calculate a single known component load, constructive and deconstructive effects of a multi-component load on the output of a strain gauge present a unique case load that requires determination of the specific components of the load. Determining the strain gauges with the largest impact on the force calculation allows for the identification of the specific strain gauges and/or strain gauge locations (e.g., out of 16 strain gauge sensor locations when using four support structures 114 with a maximum of four strain gauge sensors on each side/flat surface of the mid-portion structure 206) which can be used to accurately calculate force characteristics (e.g., magnitude, direction and/or location of the force). In the example of FIG. 4, a total of six strain gauges are identified that meet these criteria (e.g., the strain gauge(s) 204A, 204B, 204C, 204D, 204E, and/or 204F). When the number of hitch 101 components (e.g., side member(s) 110A, 110B and the frame attachment member(s) 112A, 112B) in the load path to the strain gauge(s) 204 is greater, the components deform under the load, as shown in FIG. 5B, and complicate the strain gauge outputs, such that the same individual strain gauge output can be caused by multiple load cases (e.g., a large X component can create the same output at a single strain gauge as a smaller Y component force). In the example deformation using the loading condition 500A, the highest deformations are present at the receiver tube 104, followed by the chain bracket 108, the crossbar 106, and the side member(s) 110A, 110B, in descending order. Therefore, a solution to a unique load case (e.g., with statically indeterminate conditions) is needed with a minimum number of strain gauges to determine all force components and position coordinates.

In some examples, optimization, iteration and analysis of designs using parameter-based studies can be performed (e.g., using the modeFRONTIER platform, simulation software such as ANSYS, etc.) to determine the total number and/or position of strain gauges to be used as part of the hitch system. In some examples, data mapping tools (e.g., a response surface model) can be used to interpret results from randomly varying magnitudes, directions, and/or locations of a force input while recording sensor (e.g., the strain gauge(s) 204) output from 16 possible strain gauge positions on support structure(s) 114). Load cases that are uniformly distributed across input ranges can be run to maximize the total number of inputs (e.g., 2,000 load cases). In some examples, the inputs can include varied force vector components (e.g., ±10,000 Newtons for $F_x$, $F_y$, and/or $F_z$) and varied force coordinates (e.g., ±100 mm from standard hitch ball 302 position, with testing using Position(x), Position(y), and/or Position(z)). Initially, a total of 16 strain gauge(s) 204 can be monitored, with potential to use fewer strain gauges to, for example, train a response surface model after an initial run to minimize the required sensors to be used as part of the hitch system. The response surface model can be used to calculate force values from stress readings (e.g., to be obtained using the strain gauge(s) 204). For example, as part of the hitch system design and/or optimization, it is important to accurately estimate a force magnitude and direction, not dependent on where in space the load is applied (e.g., allow calculation of any force values that are input into the system based on strain readings). As such, error evaluation can be performed (e.g., using a different set of force coordinates and components) to confirm that the response surface model can accurately calculate $F_x$, $F_y$, and $F_z$ force components (e.g., example force components 502 ($F_{tx}$), 504 ($F_{ty}$), and 506 ($F_{tz}$) of FIG. 5B). In such examples, the error can increase significantly when input force values (e.g., magnitude force value (Newtons, N)) begin to reach maximum values (e.g., 14,000N). Using the hitch system disclosed herein, the error can be maintained at 0.00% at force values of 2,000N-10,000N. At higher force values (e.g., 13,000N-16,000N), the RSM-specific error (e.g., not related to errors associated with strain gauges, noise, hysteresis, tolerances, etc.) increases (e.g., from −0.005% to −0.025%).

Accuracy of the hitch using strain gauges can be determined by inputting strain values from a unique load case (e.g., generated using finite element analysis, FEA) into the response surface model (RSM), with outputs compared to the FEA load case inputs that were used to create the strain values. For example, FEA load case inputs can include the following:

(1) an X-force input (e.g., $F_{x\_in}$=1000 N) with an X-position (e.g., $P_{x\_in}$=7657 mm);

(2) a Y-force input (e.g., $F_{y\_in}$=5000 N) with a Y-position (e.g., $P_{y\_in}$=1 mm); and (3) a Z-force input (e.g., $F_{z\_in}$=5000 N) with a Z-position (e.g., $P_{z\_in}$=487 mm).

Outputs (e.g., $F_{x\_out}$, $P_{x\_out}$, $F_{y\_out}$, $P_{y\_out}$, and $F_{z\_out}$, $P_{z\_out}$) can then be compared to the FEA load case inputs to generate an error calculation. Automating the input/output calculations allows for a more comprehensive assessment of the error in the system across a wider range of input values.

Optimization of the number of sensors (e.g., strain gauge(s) 204) to be used to calculate the force components can be performed to reduce the hitch system cost and complexity. For example, the identification of the six most sensitive sensors (e.g., the strain gauges 204A, 204B, 204C, 204D, 204E, and 204F of FIG. 4) can be performed by analyzing hitch system output sensitivity such that the most effective sensors (e.g., number and/or location) for use in the system can be selected. In some examples, the same initial data described above (e.g., input force values, etc.) can be used to train the response surface model when sensors are removed, given that the strain readings in the selected sensors should not change when the total sensor number is minimized. Likewise, an error study can be performed to confirm that, for example, six sensor response surface model results do not vary significantly from results obtained using a sixteen sensor response surface model. For example, the same level of accuracy is maintained using a smaller number of sensors when compared to using sensors at all available locations of the support structure(s) 114). As such, the strain gauge(s) 204 can be used on a variety of hitch system structures (e.g., hitch 602 of FIGS. 6A-6B) as load sensing elements when strain can be magnified to a readable value (e.g., using necking or thinning materials and/or geometries such as that of the support structure 114, as described in connection with FIG. 2, to maximize sensitivity to load). In some examples, the design of the hitch components (e.g., side member(s) 110A, 110B and the frame attachment member(s) 112A, 112B) can vary depending on expected loads and/or vehicles in which the technology is to be implemented. For example, a symmetric structural design that houses sensors outboard, as described herein, permits utilization of trailer hitch systems by estimating tongue weight of a trailer in addition to lateral and brake/acceleration loads. This is facilitated by the use of strain gauge(s) 204 attached to four structural members (e.g., support structure(s) 114) that are designed to linearly deform within the expected loading range of the vehicle.

Figure 6A:
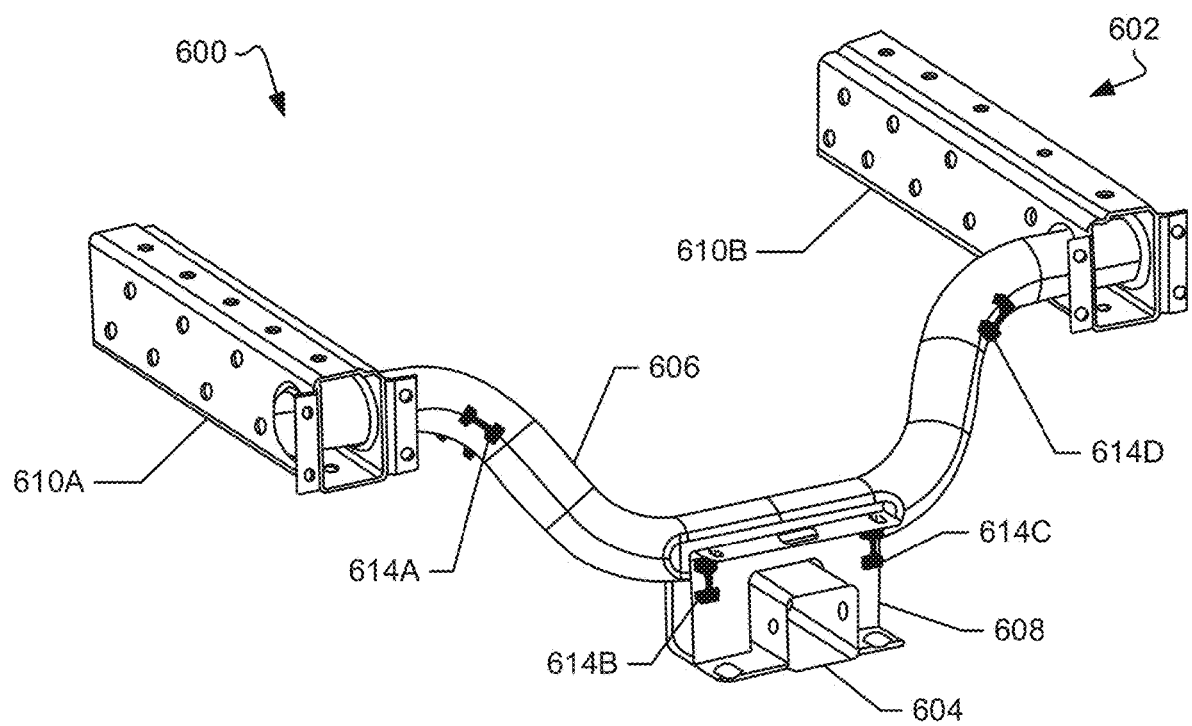
FIGS. 6A-6B illustrate example perspective views of a hitch design with strain gauges for load sensing mounted on sections of a crossbar and chain bracket.
Figure 6B:
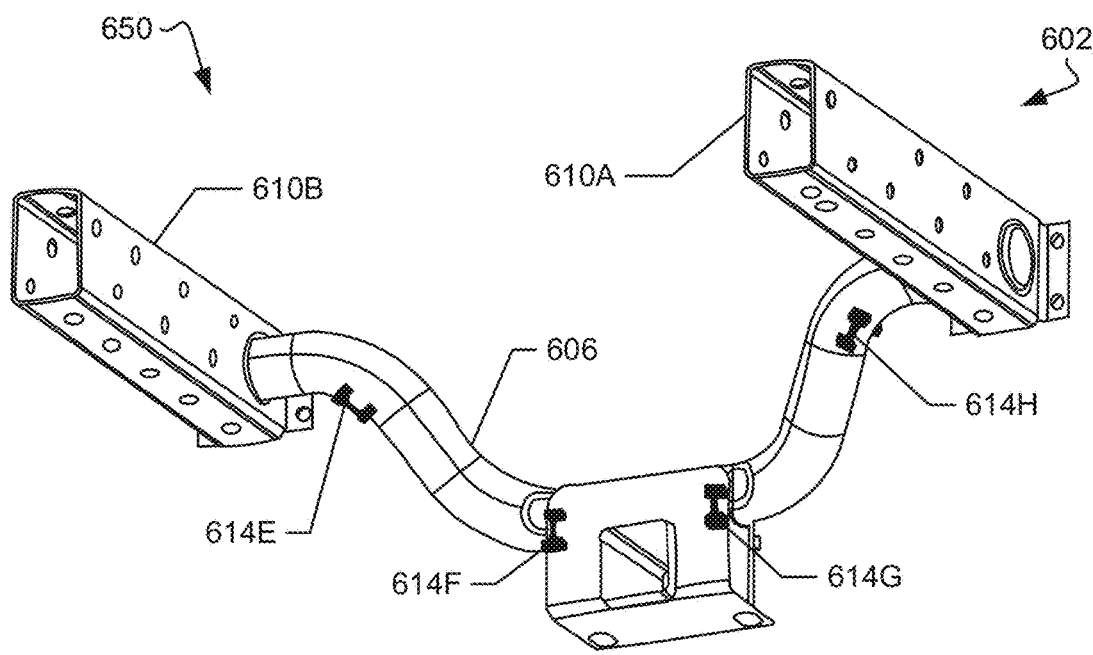

FIGS. 6A-6B illustrate example perspective views 600, 650 of a hitch 602 with strain gauges for load sensing mounted on support structures positioned on sections of a crossbar and chain bracket. The hitch 602 includes an example receiver tube 604, an example crossbar 606, an example chain bracket 608, an example first side member 610A, and an example second side member 610B. The receiver tube 604 of the hitch 602 can be used to couple a towing element (e.g., a hitch ball, a drawbar, etc.) to a vehicle (e.g., vehicle 100 of FIG. 1). Load applied at the receiver tube 604 can be transferred by the crossbar 606. The crossbar 606 connects driver and passenger sides of a vehicle frame or a vehicle body structure to the receiver tube 604 (e.g., via the side members 610A, 610B). In the illustrated example of FIGS. 6A-6B, the crossbar 606 is a single continuous tube. In other examples, the crossbar 606 can be two tubes bisected by the receiver tube 604. The chain bracket 608 surrounds the receiver tube 604 and can be used to couple a towing element (e.g., a hitch ball, a drawbar, etc.) to the vehicle.

The side members 610A, 610B (e.g., a first side member 610A and a second side member 610B) are attached to either side of the crossbar 606 and can be used to couple the hitch 602 to a vehicle. In some examples, the side member(s) 610A, 610B are coupled to the crossbar 606 via welds. However, the side member(s) 610A, 610B can be coupled to the crossbar 606 via any other suitable means (e.g., welded, riveted, press-fit, etc.). While one example implementation of the side member(s) 610A, 610B is illustrated in FIGS. 6A-6B, the side member(s) 610A, 610B can have any other suitable shape, etc.

In the example of FIG. 6A, support structure(s) 614A, 614B, 614C, 614D are positioned on the front of the hitch crossbar 606 and/or the chain bracket 608. In the example of FIG. 6B, support structure(s) 614E, 614F, 614G, 614H are positioned on the back of the hitch crossbar 606 and/or the chain bracket 608. However, the quantity and positioning of the support structure(s) 614 can vary based on, for example, the shape of the crossbar 606 and/or chain bracket 608 and/or loading forces to be applied on the hitch 602. For example, the support structure(s) 614 include strain gauges positioned to sense the force applied through the receiver tube 604, as described in more detail in connection with FIGS. 7A-7C.

In the example of FIG. 6A showing a front perspective view 600 of the hitch 602, the support structure(s) 614A, 614D are positioned on the crossbar 606 and the support structure(s) 614B, 614C are positioned on the chain bracket 608. In the example of FIG. 6B showing a rear perspective view 650 of the hitch 602, the support structure(s) 614H, 614E are positioned on the crossbar 606 opposite the strain gauge(s) 614A, 614D, respectively. Likewise, the support structure(s) 614G, 614F are positioned on the chain bracket 608 opposite the support structure(s) 614B, 614C, respectively. As described in connection with FIGS. 7A-7C, the support structure 614 positioning and/or arrangement (e.g., with corresponding strain gauge(s)) on the hitch 602 components can be determined based on loading applied on the hitch 602 (e.g., locations on the hitch 602 with high strain deformations). For example, location of the strain gauge(s) is important to the accuracy of the load sensing system, such that the layout of active strain gauges is optimized based on statistical analysis of the strain responses of the system, as previously described in connection with FIG. 5B.

Figure 7A:
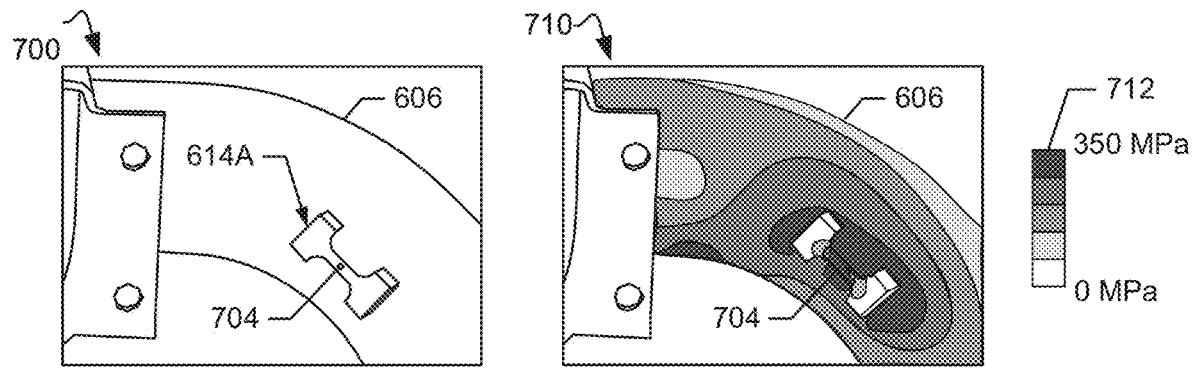
FIGS. 7A-7C illustrate example stress outputs at multiple strain gauge locations on the example hitch of FIGS. 6A-6B.
Figure 7B:
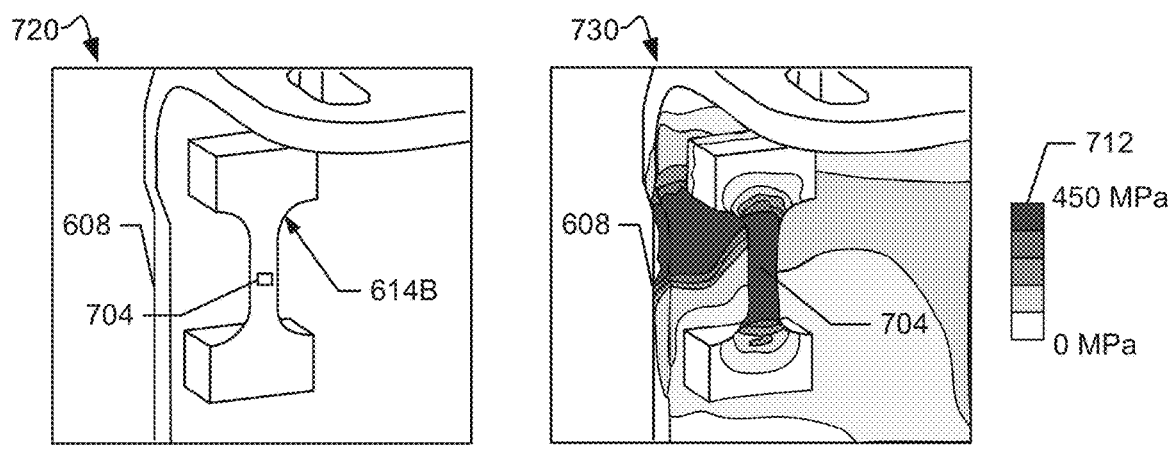
Figure 7C:
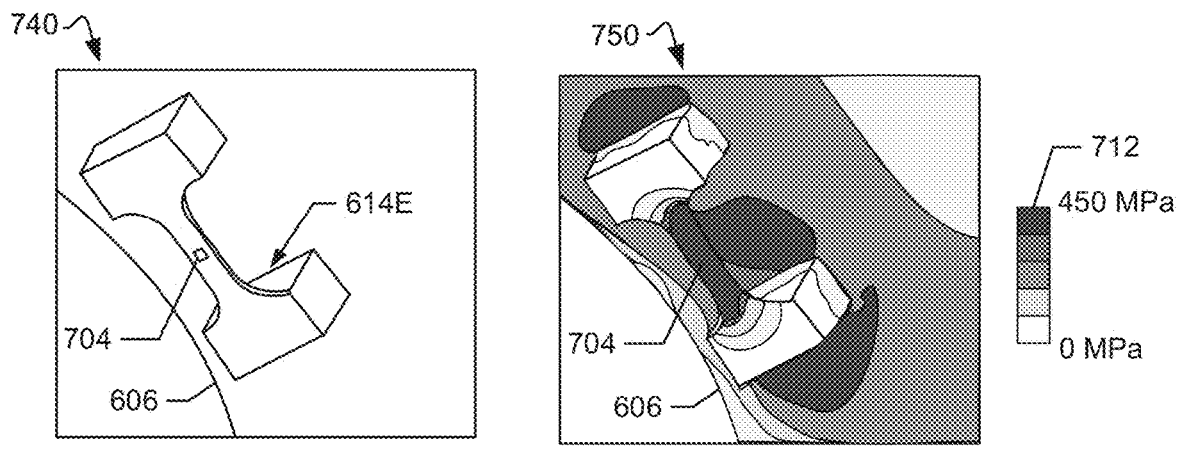

FIGS. 7A-7C illustrate example stress outputs at multiple strain gauge locations on the example hitch 602 of FIGS. 6A-6B. In example illustrations 700, 720, 740 of FIGS. 7A-7C, the support structure(s) 614A, 614B, 614E are shown mounted on the crossbar 606 and/or the chain bracket 608. The support structure(s) 614 include a strain gauge 704 positioned on a reduced cross-sectional area of the support structure 614. As described in connection with FIG. 2, the geometry of the support structure(s) 614 can be determined based on increased sensitivity to lateral loads, such that the strain gauge(s) (e.g., strain gauge 704) can capture the highest stress resulting from the applied load(s). In some examples, the support structure(s) 614 can include a raised hour-glass shape as shown in FIGS. 7A-7C, with a total length of 40-50 mm, a width of 15-25 mm at the upper and/or lower ends of the support structure 614, and a width of 8-10 mm at the reduced cross-sectional area of the support structure 614. In some examples, the support structure 614 includes a height of 10-15 mm (e.g., distance of the reduced cross-sectional area from the surface to which the support structure 614 is mounted). However, the geometry of the support structure(s) 614 can be adjusted accordingly to correspond to the strain gauge(s) used and/or the anticipated loading conditions (e.g., to provide adequate stress/strain output).

In the example of FIGS. 7A-7C, certain support structure(s) 614A, 614B, 614E are shown positioned on the hitch 602 components (e.g., crossbar 606, chain bracket 608), with a total of eight support structure(s) 614 (e.g., 614A-614H) mounted on the hitch 602 of FIGS. 6A-6B. Each of the support structure(s) 614 includes a strain gauge 704 located on the reduced cross-sectional area of the support structure (e.g., as shown in FIGS. 7A-7C) such that the strain gauge(s) 704 provide directional tensile and/or shear-based force output(s). For example, to determine positioning of the strain gauge(s) 704 on the hitch 602 components, a finite element analysis (FEA) model can be used to model application of a load (e.g., $F_x=-14,580N$, $F_z=-14,580N$) on the hitch 602 when the receiver tube 604 is coupled to a towing element (e.g., a 12 inch drawbar with a 4 inch drop, etc.). Using such an example load, a total of eight locations can be identified as having high strain deformations, with the strain gauge sensor(s) 704 mounted (e.g., in a tension and/or compression direction) on these locations of the hitch 602 via the support structure(s) 614.

Example heat maps 710, 730, 750 of FIGS. 7A-7C show stress outputs 712 on the support structure 614 mounting locations. In some examples, stress outputs can range from 300-500 MPa for reduced cross-sectional areas supporting the strain gauge(s) 704 and can be further increased based on selected loading conditions. For example, the force and/or position of the load can be varied (e.g., drop and/or drawbar length(s) adjusted) to record the corresponding strain gauge sensor outputs. In some examples, six strain gauge signals on the hitch 602 (e.g., tension and shear force outputs) can be used to solve for a statically indeterminate system, the methodology of solving for such a system described in connection with FIG. 5B. However, a total of twelve signals can be monitored using the eight strain gauge(s) 704 of FIGS. 6A-6B. For example, four strain gauge sensors can be used to monitor both tension and shear force outputs, with four other strain gauge sensors used to monitor load-based tension force outputs. FIGS. 7A-7C indicate that some of the maximum stress output measurements on the hitch 602 can be measured at crossbar 606 area(s) proximate to the side member(s) 610A, 610B of FIGS. 6A-6B, as well as near the edge(s) of the chain bracket 608. As such, the support structures 614 with strain gauge(s) 704 are positioned in areas that show maximal stress outputs. In the example of FIG. 7A, a maximum of 350 MPa can be measured using the strain gauge 704 positioned on the support structure 614A. In the example of FIG. 7B, a maximum of 450 MPa can be measured using the strain gauge 704 positioned on the support structure 614B located on the edge of the chain bracket 608. In the example of FIG. 7C, a maximum of 450 MPa can be measured on another section of the crossbar 606 using a strain gauge 704 positioned on the support structure 614E. As such, the precise locations and/or mounting positions of the strain gauge(s) 704 can be optimized to determine the system of strain gauges to utilize for a specific hitch design (e.g., hitch 101, hitch 602, etc.).

Figure 8:
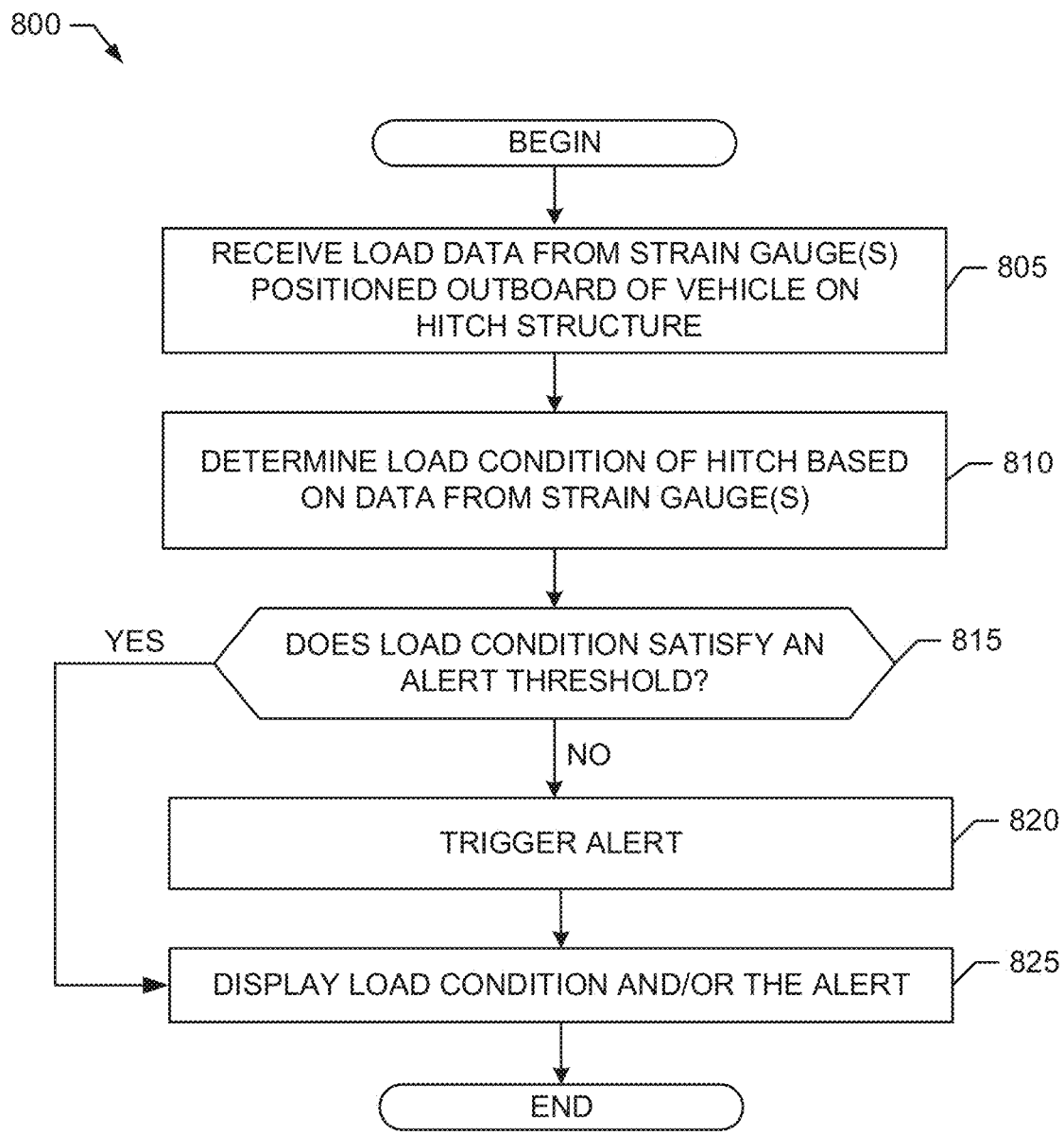
FIG. 8 is a flowchart representative of machine readable instructions that may be executed to implement the load manager of FIG. 1.

A flowchart representative of example methods, hardware implemented state machines, and/or any combination thereof for implementing the load manager 102 of FIG. 1 is shown in FIG. 8. The method may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example load manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example method 800 of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 8 is a flowchart representative of machine readable instructions 800 that may be executed to implement the load manager 102 of FIG. 1. The sensor interface 120 receives load data from sensors (e.g., the strain gauge(s) 204) positioned outboard of the vehicle on the hitch 101 structure (block 805). For example, the sensor interface 120 can receive load data from the strain gauge(s) 204A, 204B, 204C, 204D, 204E, and/or 204F of FIG. 4, which are positioned on the support structure(s) 114 and/or strain gauge(s) 704 of FIGS. 7A-7C, which are positioned on the support structure(s) 614A-614H. In some examples, the sensor interface 120 can receive data from the strain gauge(s) 204A, 204B, 204C, 204D, 204E, and/or 204F of FIG. 4 and/or strain gauge(s) 704 of FIG. 7A-7C in an analog signal (e.g., a voltage, a current, etc.). In some examples, the sensor interface 120 converts the analog signal into a digital value (e.g., a force, a pressure, etc.). Once the sensor interface 120 has received data from the sensors, the load determiner 122 determines load conditions of the hitch 101 based on data from the strain gauge(s) 204 and/or strain gauge(s) 704 (block 810). For example, the load determiner 122 can determine the load condition on the hitch 101 using static equilibrium analysis and/or analysis for a statically indeterminate system, as described in connection with FIGS. 4-5. In some examples, the load determiner 122 can determine at least one of the vertical load condition, the horizontal load condition, and/or the lateral load condition. In other examples, the load determiner 122 can use any other suitable means to determine the load condition.

The load determiner 122 further determines if the load condition satisfies an alert threshold (block 815). If the load determiner 122 determines the load condition satisfies an alert threshold, the vehicle interface 124 can be used to display the alert condition to a user (e.g., via display 103) (block 825). If the load determiner 122 determines the load condition does not satisfy an alert threshold, an alert is triggered to inform the user (block 820). For example, the load condition can include various characteristics (e.g., weight, load orientation, braking force, etc.) experienced by the hitch 101. In some examples, the load determiner 122 can be used to estimate tongue weight of a trailer to promote proper utilization of trailer hitch systems in addition to lateral and brake/acceleration loads. If the load condition is determined to not be capable of maintaining the necessary strength to support a tow rating, the load determiner 122 can generate an audio alert, a visual alert, etc. In some examples, the load determiner 122 can generate an alert including a description of the load condition triggering the alert. In some examples, the load determiner 122 can generate an instruction indicating how to correct the load condition. In some examples, the vehicle interface 124 presents the load condition and/or alert (block 825). For example, the vehicle interface 124 can cause the vehicle 100 to present the load condition and/or the alert to the user via the display 103.

Figure 9:
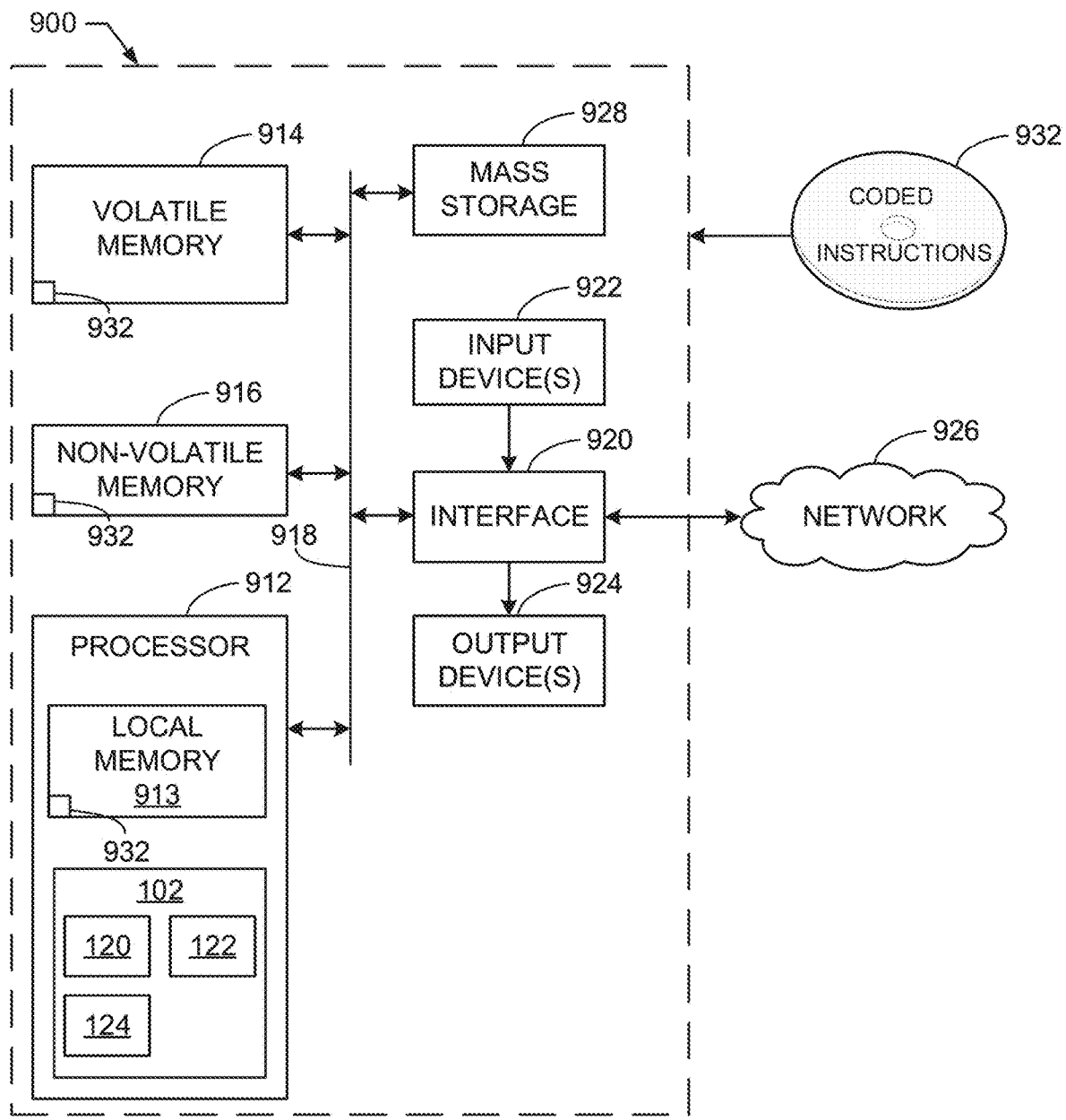
FIG. 9 is a block diagram of an example processing platform structured to execute the instructions of FIG. 6 to implement the load manager of FIG. 1.

FIG. 9 is a block diagram of an example processing platform 900 structured to execute the instructions of FIG. 8 to implement the load manager 102 of FIG. 1. The processor platform 900 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interface 120, an example load determiner 122, and the example vehicle interface 124.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 9 may be stored in the mass storage device 928, in the volatile memory 914, in the non-volatile memory 916, and/or on a removable non-transitory computer readable storage medium such as a CD or DVD.

Example methods and apparatus for a load-sensing hitch utilizing a system of strain gauges are disclosed herein. Example 1 includes an apparatus comprising a hitch including a first support including a first end, a second end, and a mid-portion located between the first end and the second end, the mid-portion having a cross-sectional area smaller than the cross-sectional area of the first end or the cross-sectional area of the second end, a strain gauge located at the mid-portion of the first support, a frame attachment to couple the hitch to a frame of a vehicle, the support coupled to the frame attachment, and a load manager to determine a load condition based on sensor data from the strain gauge.

Example 2 includes the apparatus of Example 1, further including a side member, the side member coupled to a crossbar of the hitch, the first support located between the side member and the frame attachment.

Example 3 includes the apparatus of Example 2, wherein loading of the hitch results in a deflection of the side member.

Example 4 includes the apparatus of Example 3, wherein the deflection of the side member results in hitch deformation, the deformed hitch a statically indeterminate structure.

Example 5 includes the apparatus of Example 1, further including a second support, a third support, and a fourth support, each of the second, third, and fourth supports including at least one strain gauge operating with the strain gauge of the first support to determine a force on the hitch, the strain gauges forming a system of strain gauge sensors.

Example 6 includes the apparatus of Example 5, wherein the system of strain gauge sensors includes at least six strain gauge sensors.

Example 7 includes the apparatus of Example 5, wherein the load manager determines the load condition based on sensor data from the strain gauges located at the second support, the third support, and the fourth support.

Example 8 includes the apparatus of Example 7, wherein the load condition includes a load applied to a ball of the hitch, the load condition determined using a force magnitude, a force location, or a force direction.

Example 9 includes the apparatus of Example 1, further including a sensor interface to receive strain data from the strain gauge, the strain data interpreted as load data based on calibration measurements.

Example 10 includes a method, comprising receiving load data associated with a hitch from a strain gauge, the strain gauge positioned at a mid-portion of a first support, the first support coupled to a frame attachment connected to a frame of a vehicle, determining a load condition of the hitch, the load condition determined using the load data, and generating an alert for display via a user interface when a load on the hitch exceeds a tow rating of the vehicle.

Example 11 includes the method of Example 10, wherein determining the load condition includes receiving load data from at least one strain gauge positioned at a second support, a third support, or a fourth support.

Example 12 includes the method of Example 11, wherein two of the four supports include at least two strain gauges positioned at the mid-portion of each of the supports.

Example 13 includes the method of Example 12, wherein determining the load condition includes determining a force magnitude, a force location, or a force direction using the strain gauges positioned at the first support, the second support, the third support, or the fourth support.

Example 14 includes the method of Example 10, wherein loading of the hitch results in deflection of a side member, the first support positioned between the side member and the frame attachment.

Example 15 includes the method of Example 14, wherein the deflection results in hitch deformation, the deformed hitch a statically indeterminate structure.

Example 16 includes a non-transitory computer readable storage medium comprising instructions that, when executed, cause a processor to at least receive load data associated with a hitch from a strain gauge, the strain gauge positioned at a mid-portion of a first support, the first support coupled to a frame attachment connected to a frame of a vehicle, determine a load condition of the hitch, the load condition determined using the load data, and generate an alert for display via a user interface when a load on the hitch exceeds a tow rating of the vehicle.

Example 17 includes the non-transitory computer readable storage medium of Example 16, wherein the instructions, when executed, cause a processor to receive load data from at least one strain gauge positioned at a second support, a third support, or a fourth support.

Example 18 includes the non-transitory computer readable storage medium of Example 17, wherein the instructions, when executed, cause a processor to determine a force magnitude, a force location, or a force direction using the strain gauges positioned at the first support, the second support, the third support, or the fourth support.

Example 19 includes the non-transitory computer readable storage medium of Example 16, wherein the instructions, when executed, cause a processor to determine the load condition using at least six strain gauges.

Example 20 includes the non-transitory computer readable storage medium of Example 16, wherein the instructions, when executed, cause a processor to determine the load condition based on a load applied at a ball of the hitch.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a hitch including:
     a first support including a first end, a second end, and a mid-portion located between the first end and the second end, the mid-portion having a cross-sectional area smaller than the cross-sectional area of the first end or the cross-sectional area of the second end;
     a first strain gauge located at the mid-portion of the first support;
     a frame attachment to couple the hitch to a frame of a vehicle, the first support coupled to the frame attachment;
     a side member coupled to a crossbar of the hitch, the first support located between the side member and the frame attachment; and
     a load manager to determine a load condition based on first sensor data from the first strain gauge.

2. The apparatus of claim 1, wherein loading of the hitch results in a deflection of the side member.

3. The apparatus of claim 2, wherein the deflection of the side member results in hitch deformation, the deformed hitch a statically indeterminate structure.

4. The apparatus of claim 1, further including a second support, a third support, and a fourth support, each of the second support, the third support, and the fourth support supports including a corresponding one of a plurality of strain gauges, the plurality of straining gauges including the first strain gauge.

5. The apparatus of claim 4, wherein the plurality of strain gauges includes at least six strain gauge sensors.

6. The apparatus of claim 4, wherein the load manager determines the load condition based on second sensor data from the plurality of strain gauges.

7. The apparatus of claim 6, wherein the load condition includes a load applied to a ball of the hitch, the load condition determined using a force magnitude, a force location, or a force direction.

8. The apparatus of claim 1, further including a sensor interface to receive strain data from the first strain gauge, the strain data interpreted as load data based on calibration measurements.

9. A method, comprising:
   receiving first load data associated with a hitch from a first strain gauge, the first strain gauge positioned at a mid-portion of a first support, the first support coupled to a frame attachment connected to a frame of a vehicle;
   receiving second load data from a second strain gauge positioned at a second support, a third support, or a fourth support;
   determining a load condition of the hitch, the load condition determined using the first load data and the second load data; and
   generating an alert for display via a user interface when a load on the hitch exceeds a tow rating of the vehicle.

10. The method of claim 9, wherein two supports of the first support, the second support, the third support, or the fourth support include include two strain gauges positioned at a corresponding mid-portion of each of the two supports.

11. The method of claim 10, wherein determining the load condition includes determining a force magnitude, a force location, or a force direction using the two strain gauges.

12. The method of claim 9, wherein loading of the hitch results in deflection of a side member, the first support positioned between the side member and the frame attachment.

13. The method of claim 12, wherein the deflection results in hitch deformation, the deformed hitch a statically indeterminate structure.

14. A non-transitory computer readable storage medium comprising instructions that, when executed, cause a processor to at least:
   receive first load data associated with a hitch from a first strain gauge, the first strain gauge positioned at a mid-portion of a first support, the first support coupled to a frame attachment connected to a frame of a vehicle;
   determine a load condition of the hitch, the load condition determined using the first load data, the load condition determined using at least six strain gauges; and
   generate an alert for display via a user interface when a load on the hitch exceeds a tow rating of the vehicle.

15. The non-transitory computer readable storage medium of claim 14, wherein the instructions, when executed, cause a processor to receive second load data from a second strain gauge of the at least six strain gauges, the second strain gauge positioned at a second support.

16. The non-transitory computer readable storage medium of claim 14, wherein the instructions, when executed, cause a processor to determine a force magnitude, a force location, or a force direction using the at least six strain gauges.

17. The non-transitory computer readable storage medium of claim 14, wherein the load is applied at a ball of the hitch.

* * * * *

UNITED STATES PATENT AND TRADEMARK OFFICE
CERTIFICATE OF CORRECTION

PATENT NO. : 11,524,534 B2
APPLICATION NO. : 16/848486
DATED : December 13, 2022
INVENTOR(S) : Giaier et al.

It is certified that error appears in the above-identified patent and that said Letters Patent is hereby corrected as shown below:

In the Claims

In Claim 10, in Line 28, delete "include include" and insert --"include"--.

Signed and Sealed this
Fourth Day of April, 2023

Katherine Kelly Vidal
*Director of the United States Patent and Trademark Office*